Patented June 28, 1949

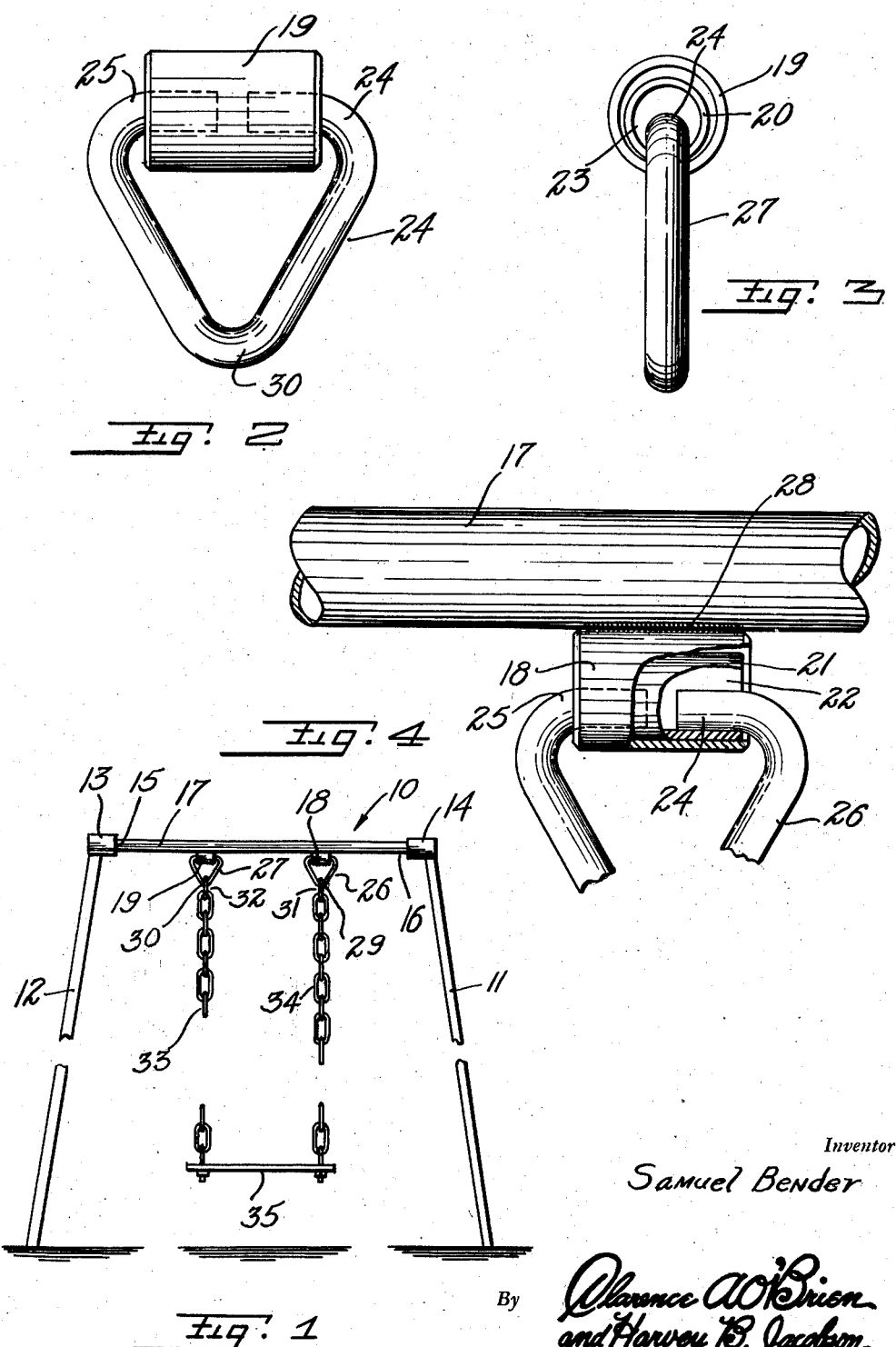

2,474,718

UNITED STATES PATENT OFFICE 2,474,718

SWING SUSPENSION

Samuel Bender, Shreveport, La.

Application October 16, 1945, Serial No. 622,627

1 Claim. (Cl. 155—58)

My invention relates to playground equipment and has for an object to provide a swing support having bearings connected thereto.

Another object of this invention is to provide a swing in which friction is reduced to a minimum.

A further object of the device is to provide a bearing tube supported within an enlarged supporting tube.

A primary object of my invention is to provide means for distributing friction among a series of members.

Other features and advantages will become more readily apparent from the following description and the accompanying illustrative drawings in which:

Figure 1 is an elevational view of my improved swing,

Figure 2 is an enlarged detail elevation of a bearing member,

Figure 3 is an end view thereof, and

Figure 4 is an enlarged detail of a support and bearing.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

My improved swing 10, consists of uprights 11 and 12, having tubular heads 13 and 14, for receiving the ends 15 and 16, of a horizontal tube 17, to the intermediate portion of which are spaced supporting tubes 18 and 19, for bearing tubes 20 and 21, of reduced diameter. Into the opposite ends 22 and 23, of the latter bearings are projected the horizontal terminals 24 and 25, of triangular open links 26 and 27.

The tubes 18 and 19, are preferably welded, as at 28, to the supporting tube 17. Into the apex portions 29 and 30, of said links are the upper links or loops 31 and 32, of chains or other suspension members 33 and 34, for the seat 35.

The friction of the connecting members of the swing is distributed as follows: Between the links 31 and 32, and the open links 26 and 27, then between the open links and the tubes 20 and 21, then between the said tubes and the outer tubes 18 and 19, and finally between the supporting tube 17, and its bearings 13 and 14. Thus it will be seen that friction due to operation of the swing is so widely distributed that wear on any one member is reduced to a minimum, which of course will greatly extend the life of the swing.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

The combination with a playground swing having spaced upright supports and a horizontal swing supporting tube secured to the upper ends thereof, aligned supporting tubes secured to the lower and outer surface of said horizontal tube, said supporting tubes being spaced from each other, aligned bearing tubes of reduced diameter disposed in said aligned supporting tubes having rolling contact with the inner end of lower walls of said supporting tubes and having their upper and outer surfaces spaced from the inner surfaces of said supporting tubes, triangular shaped open links supported in the opposite ends of said bearing tubes with the opposed link ends at the open ends of said links being spaced a less distance than the diameter of said supporting tubes and having rolling contact therewith, and swing chains and a seat supported by said links.

SAMUEL BENDER.

REFERENCES CITED

The following references are of record in the file of this patent:

UNITED STATES PATENTS

| Number | Name | Date |
|---|---|---|
| 89,038 | Greene | Apr. 20, 1869 |
| 163,599 | McClevey | May 25, 1875 |

(Other references on following page)

UNITED STATES PATENTS

| Number | Name | Date |
|---|---|---|
| 171,969 | Blakeslee | Jan. 11, 1876 |
| 460,232 | Hoen | Sept. 29, 1891 |
| 855,493 | App | June 4, 1907 |
| 1,139,464 | Dakin | May 11, 1915 |
| 1,258,267 | Soleau | Mar. 5, 1918 |
| 1,419,806 | Birch | June 13, 1922 |
| 1,436,481 | Cook | Nov. 21, 1922 |
| 1,493,913 | Whiteside | May 13, 1924 |
| 1,599,656 | Crowley | Sept. 14, 1926 |
| 1,770,152 | Conlan | July 8, 1930 |
| 1,845,142 | Friesner | Feb. 16, 1932 |
| 2,387,721 | DeBruin | Oct. 30, 1945 |

FOREIGN PATENTS

| Number | Country | Date |
|---|---|---|
| 576,073 | France | May 5, 1924 |